Oct. 6, 1953     W. R. PETERSON ET AL     2,654,344
MECHANIZED FEEDING MECHANISM FOR ANIMALS
Filed Aug. 29, 1947     11 Sheets-Sheet 1

Inventors
Walter R. Peterson
Adelbert C. Radtke
By Paul O. Pippel
Atty

Inventors.
Walter R. Peterson
Adelbert C. Radtke
By Paul O. Pippel
Atty.

Oct. 6, 1953    W. R. PETERSON ET AL    2,654,344
MECHANIZED FEEDING MECHANISM FOR ANIMALS
Filed Aug. 29, 1947    11 Sheets-Sheet 7

Inventors:
Walter R. Peterson
Adelbert C. Radtke

Oct. 6, 1953 W. R. PETERSON ET AL 2,654,344
MECHANIZED FEEDING MECHANISM FOR ANIMALS
Filed Aug. 29, 1947 11 Sheets-Sheet 11

Fig. 21.

Inventors.
Walter R. Peterson
Adelbert C. Radtke
By Paul O. Rippel
Atty.

Patented Oct. 6, 1953

2,654,344

UNITED STATES PATENT OFFICE 2,654,344

MECHANIZED FEEDING MECHANISM FOR ANIMALS

Walter R. Peterson, Hinsdale, and Adelbert C. Radtke, Oak Park, Ill., assignors to International Harvester Company, a corporation of New Jersey Application August 29, 1947, Serial No. 771,250

10 Claims. (Cl. 119—16)

This invention relates to an automatically controlled feeding mechanism for a dairy establishment.

Despite the many innovations and advances that have been made in the agricultural art, and notwithstanding the rapid progress made in scientific farming, few improvements have been made in one of the most expensive and time consuming operations, namely, that of feeding and supplying to the wants of a herd of dairy animals. The construction of barns, and especially dairy barns, has changed little and prior to this invention the farmer still had to feed the animals by hand, thus spending the greater part of his working day in preparing and mixing quantities of feed for the various animals.

It is well known in the dairy art that dairy cows must be treated individually with respect to feeding so that the best possible results may be obtained from each cow. In other words, the feeding demands of each cow vary quite generally and it is absolutely necessary, for proper feeding, to prepare the specific kind, quantities and qualities of feed that are needed by each individual cow. This preparation must be accurate within close limits in order to secure an efficient feeding system. The farm operator generally understands the selective feeding requirement of each cow and generally takes great care in the operation of feed mixing. However, this mixing operation is largely a process of measuring the quantities of feed by hand; then manually distributing the quantities to the individual cows. The results of this method leave much to be desired, since the manual selective feeding of cows is an inaccurate and time consuming operation.

It can readily be understood and realized that accuracy is difficult when the measuring of the feed is accomplished with the use of a shovel, pitch fork, or other manual implement. The time factor alone in this type of feeding operation is excessive and undesirable. Frequently an operator is required to spend his full working day in supervising and preparing this time consuming operation.

Dairy barns have, of course, been designed to best accommodate the many manual chores attendant to the feeding and cleaning operation of the dairy herd. Feed alleys were accordingly made wide enough to provide sufficient room for the farmer to spread the feed into the individual mangers of the cows. Since the manual operation takes considerable elbow room, a dairy barn had to be quite large and therefore construction costs became exceedingly expensive. Applicants have provided a mechanized feeding unit for their barn that eliminates large areas that would otherwise be necessary in a manual feed type barn. Since the feeding is largely a mechanical operation, greater sanitation is also obviously a result. In barns where the feeding is done by manual operation, it is necessary for the operator to clean the feed alley at periodic intervals. He usually cleans this alley at the same time he cleans the refuse trough and consequently bacteria and trash matter may be carried from one end of the barn to the other on the shoes of the operator. Thus the feed alley may become contaminated and in time cause unhealthful conditions for the animals. In applicants' construction, the feed alley is removed and replaced by a manger belt which is automatically cleaned.

An object is to provide a sanitary manger belt, said manger belt being of the endless type and arranged to receive predetermined quantities of feed and convey the same to the feeding end of a plurality of stalls within a dairy barn.

Still another object is to provide a shredder mechanism arranged to remove predetermined quantities of ensilage and deposit the same on said manger belt.

Still another object is to provide a hay conveyor arranged to movably support bales of hay and carry the same to a shredding mechanism, said shredding mechanism being arranged to remove and deposit predetermined quantities of hay onto a movable manger belt.

A further object is to provide a shredder mechanism for removing quantities of hay and deposit the same upon a movable manger belt, said shredder mechanism including an endless belt having scraper blades thereon, said belt being movable about vertical axes and arranged to drive an ensilage conveyor and a hay feed conveyor.

Still another object is to provide an improved feeding device for automatically delivering predetermined quantities and qualities of grain or feed mixtures onto a movable manger belt.

A still further object is to provide a novel electrical control mechanism operable to accurately and automatically predetermine and supply proper quantities of feed to the manger of each individual cow.

These and other objects will become more readily apparent upon a reading of the description when examined in conjunction with the accompanying drawings.

Figure 1:
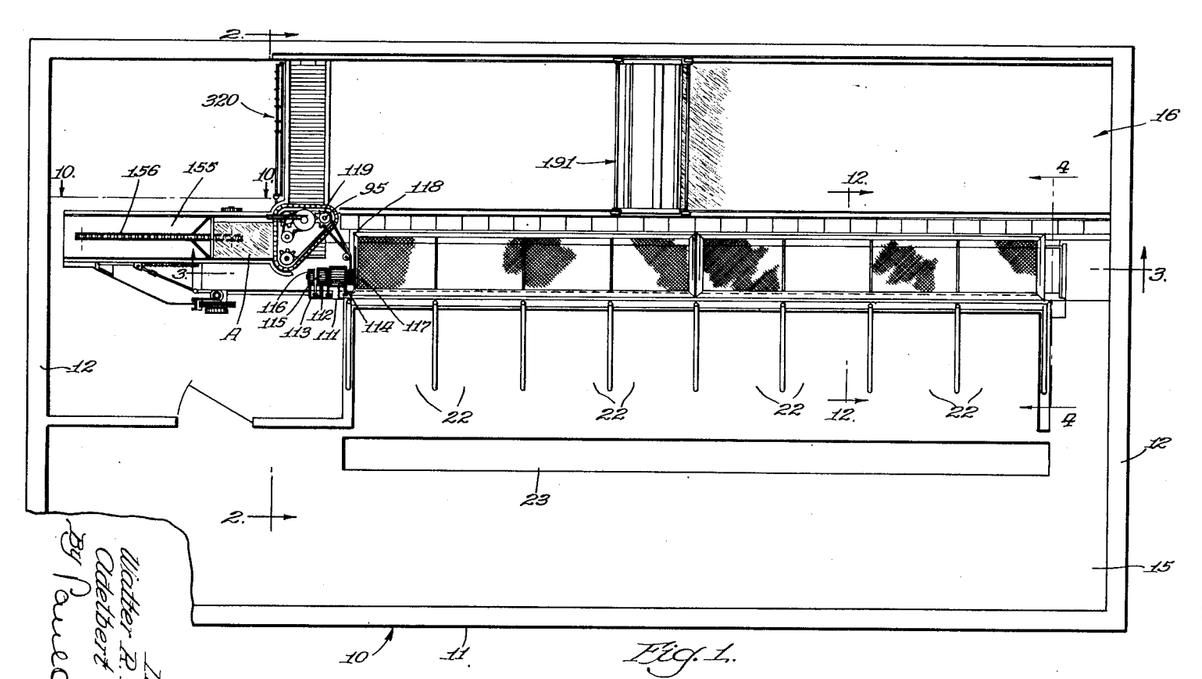
Figure 1 is a dairy barn having its roof removed therefrom to show in plan view a mechanized feeding mechanism for supplying feed to the animals situated within the barn, some of the objects within this barn being shown in section to better illustrate the invention.
Figure 2:
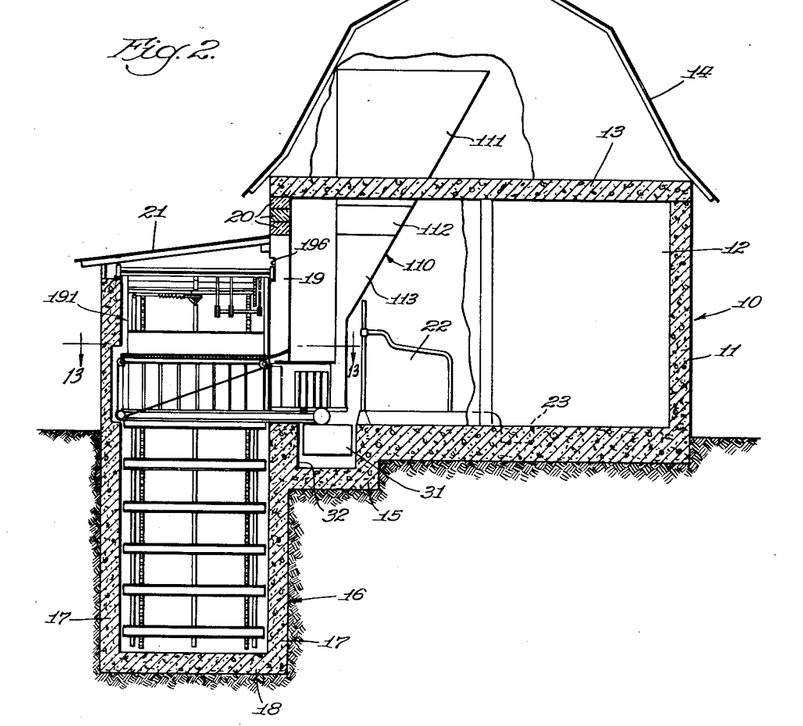
Figure 2 is a sectional end view of the barn and feeding mechanism therein taken along the line 2—2 of Figure 1.

The dairy establishment with which the present invention is concerned includes a barn structure generally indicated by the reference character 10 as best shown in Figures 1 and 2. This type of barn structure is constructed to house a mechanized feeding unit for supplying feed to the dairy animals and consists generally of side walls 11, end walls 12, and an upper supporting floor 13 on which a roof 14 is supported. The construction generally is of concrete, thereby providing a solid fire-proof building. The lower floor is indicated by number 15. Immediately adjacent one side of the barn structure 10 a trench silo 16 is provided. The trench silo is constructed of vertical concrete walls 17 extending a considerable distance into the ground, where they are joined by a floor or bottom 18. A common vertical wall 19 serves as a wall for the trench silo and also for the barn. The silo therefore affords protection against weather thus protecting the common wall. The area adjacent this common wall, within the barn, is thus kept relatively warm during cold weather.

In order to properly permit light to enter the interior of the barn 10, a few courses of glass blocks 20 are laid between the wall 19 and the upper floor 13. An overlapping sectional metal roof 21 is placed over the trench silo, these roof sections being readily opened or removed if desired to supply ensilage to the silo.

As best shown in Figures 1 and 2, the barn 10 is provided with eight animal stalls 22. These stalls 22 are arranged near the warm side of the barn, adjacent the common wall 19. A gutter 23 is formed in the concrete floor 15 of the barn.

*Endless manger belt mechanism*

Figure 3:
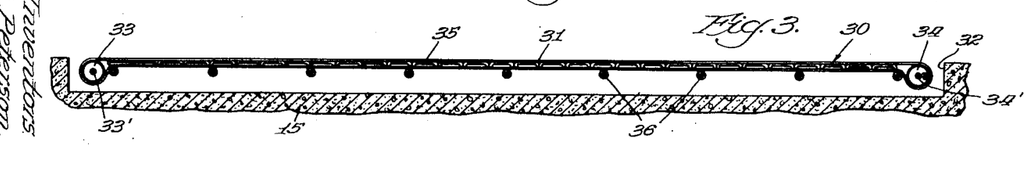
Figure 3 is a sectional view of a removable manger belt taken along the line 3—3 of Figure 1, this view showing the relation of the manger belt with respect to the floor of the barn.

As best shown in Figures 2 and 3, an endless manger belt 30 is positioned adjacent the forward or feeding end of each stall 22. A manger belt 31 is of the endless type and may be made of any flexible material such as natural or synthetic rubber, etc. This belt is recessed within a recess 32 formed in the concrete flooring, the upper surface of the belt providing the manger or feeding surface for the cows. The belt 31 is wrapped around a steel drum 33 which is journaled on a shaft 33'. The other end of the belt 31 is wrapped around a drum 34 journaled on a shaft 34'. The shafts 33' and 34' are suitably supported on the adjacent concrete construction.

Figure 4:
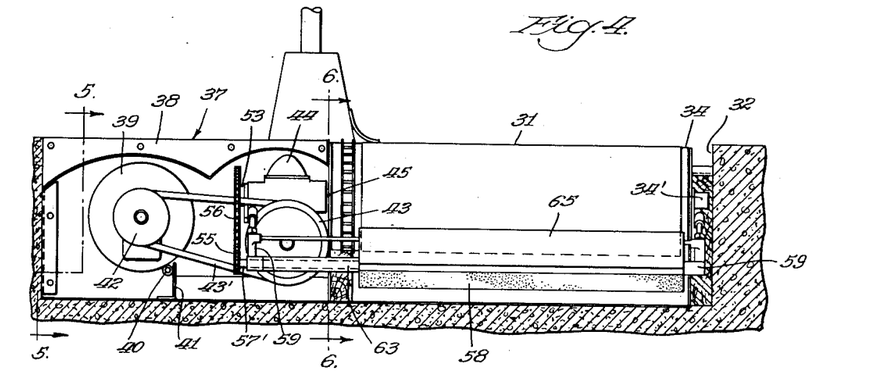
Figure 4 is an enlarged sectional view taken along the line 4—4 of Figure 1 showing the driving arrangement for a manger belt.
Figure 5:
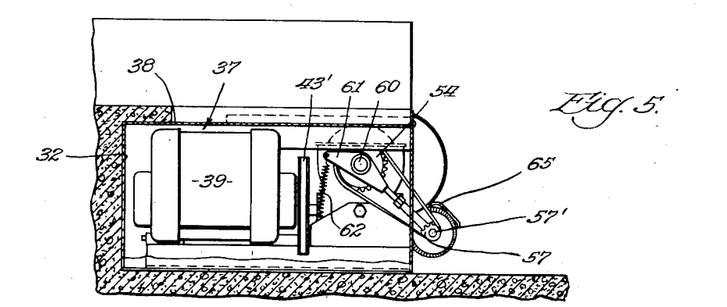
Figure 5 is a sectional view through the driving arrangement of a manger belt taken along the line 5—5 of Figure 4.

The manger belt 31, during its movement, is supported on a metal supporting structure 35 which is also supported by the concrete structure. A plurality of longitudinally spaced rollers 36 are provided underneath the endless belt 31 for supporting the lower loop of the belt. The endless manger belt 31 is driven by a driving unit generally indicated by the reference character 37 as shown in Figures 4 and 5. The driving unit 37, like the manger belt 31, is recessed within the concrete floor 15 of the barn. A metal box 38 encloses the driving structure.

The box 38 contains an electric driving motor 39, which is pivotally connected as indicated at 40 to an angle support 41 rigid within the box 38. The motor 39 is positioned to drive a V-belt pulley 42 which in turn drives a V-belt pulley 43 by means of a type V-belt 43'. The pulley 43 rotates a shaft which extends into a gear reduction mechanism indicated at 44. The gear reduction mechanism is not shown in detail and may be of any conventional type. A stub shaft 45 extends laterally outwardly from the gear reduction mechanism 44 and is connected to drive a sprocket 46. The sprocket 46 includes sprocket teeth 47 engageable with recessed slots 48 formed in the outer peripheral edge of a metal sprocket member 49.

Figure 6:
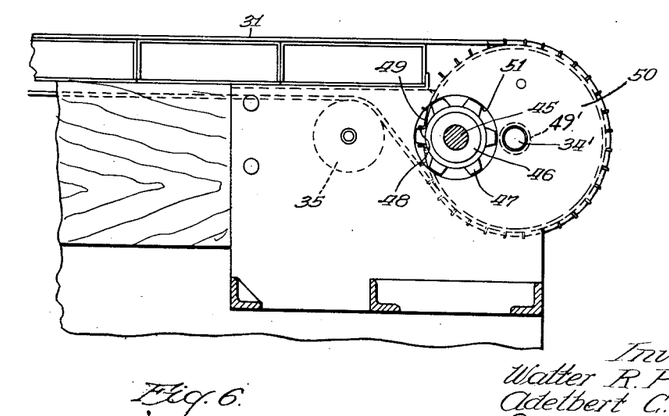
Figure 6 is a sectional view taken along the line 6—6 of Figure 4.

As best shown in Figure 6, the metal sprocket member 49 is partially covered by a plate 50 having an opening 51 through which the sprocket 46 and the shaft 45 extend. The metal sprocket 49 is rigidly connected to bearings 49', only one of which is shown, which are freely journaled on the shaft 34'. The bearings 49' are rigid with the driving drum 34 to drive the same and thus effect longitudinal movement of the manger belt 31.

A shaft 53 extends outwardly of the gear reduction mechanism 44 and this shaft is in driving connection with a sprocket 54, as best shown in Figure 5, said sprocket being in driving engagement with a chain 56 arranged to drive a sprocket 57 and shaft 57'. A brush 58 is positioned underneath and at the side of the drum 34 in such a manner that it may engage the outer surface of the moving endless manger belt 31. The brush 58 is held in this position by means of a pair of arms 59, one of which is pivoted on the shaft 53 at one end. The other arm is pivoted on a stub shaft in similar position not shown. Both arms 59 are provided with extensions 61 to which are attached tension springs 62, said springs serving to resiliently hold brush 58 against the outer surface of the endless manger belt. The shaft 57' extends through bearing 63 and serves to rotate the brush 58. As shown in Figures 4 and 5, a deflecting plate 65 is connected above the brush 58 for diverting material which is brushed from the manger belt surface.

*The shredder mechanism*

Figure 7:
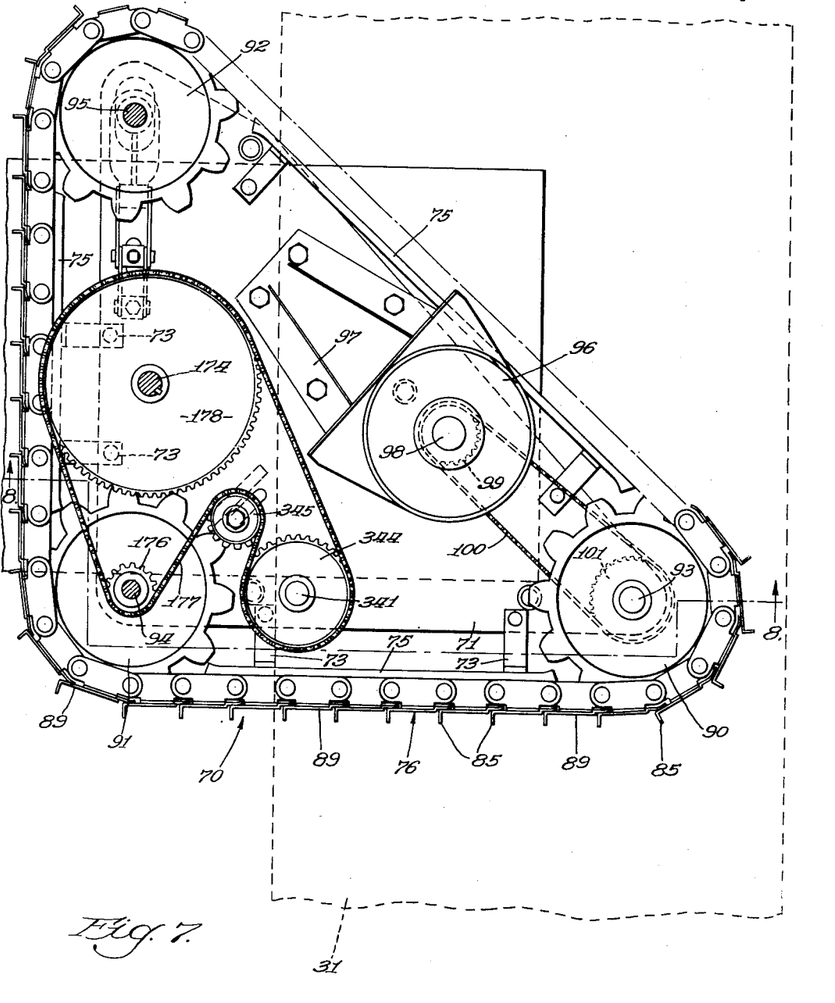
Figure 7 is a plan view showing the driving arrangement and internal parts of a triangular shredding mechanism.
Figure 8:
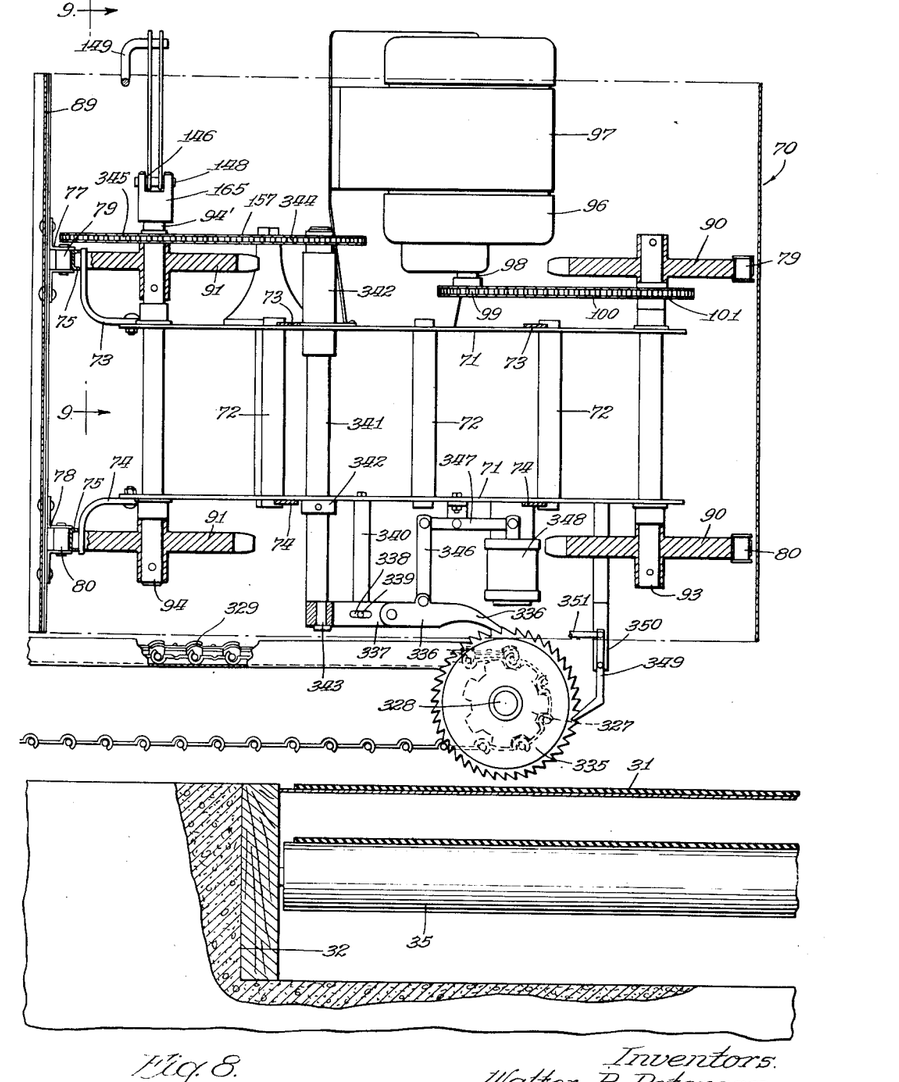
Figure 8 is an enlarged sectional view of the shredder mechanism taken along the line 8—8 of Figure 7 with certain parts broken away.

As best shown in Figures 2, 7, and 8, a shredder mechanism is generally indicated by the reference character 70. The shredder mechanism 70 is provided for the dual purpose of shredding and delivering predetermined amounts of ensilage and hay to the surface of the manger belt 31.

The shredder mechanism 70 consists of a pair of spaced supporting plate members 71 which are suitably connected by vertical spacer members 72. A plurality of upwardly and downwardly bent brackets, 73 and 74 respectively, are positioned around the triangular periphery of the plate members 71. Spaced channel guide members 75 are rigidly connected to the brackets 73 and 74, and these channel guide members support an endless track shredder cleated belt or apron 76. The shredder apron 76 is provided on its inner surface with an upper track chain 77 and a lower track chain 78. The track chains 77 and 78 are respectively provided with rollers 79 and 80 which extend throughout the full length of each chain. The outer surface of the endless shredder apron 76 is provided with a plurality of evenly spaced scraper or shredder cleats 85.

As best shown in Figure 7, sprocket sets 90, 91, and 92 are positioned in triangular relation. These sprockets are respectively positioned for movement about a vertical axis on shafts 93, 94, and 95.

An electric motor 96 is positioned above the sprockets 90, 91, and 92 by means of a bracket 97. The motor 96 is arranged to drive a shaft 98 which is connected to a sprocket 99 which is in driving engagement with a chain 100 arranged to drive a sprocket 101. The sprocket 101 is rigidly secured to the shaft 93, thereby driving the shaft 93 and effecting driving movement to sprocket 90. The sprockets 90, 91, and 92 are in mating engagement with the rollers 79 and 80. Movement of the shredder apron 76 is effected by rotating the sprockets 90 by means of the motor 96.

*The hopper feeding mechanism*

Figure 13:
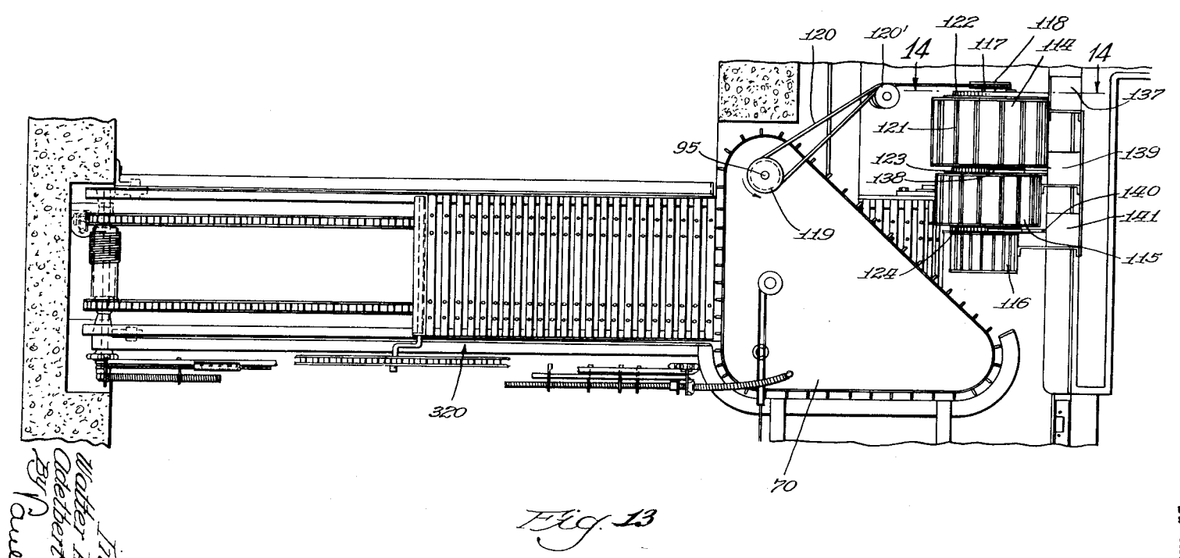
Figure 13 is a plan view in partial section showing portions of a grain feeding mechanism, an ensilage feeding mechanism and a shredding unit said view being taken along the line 13—13 of Figure 2.

The hopper feeding mechanism is best illustrated in Figures 1, 2, 13, and 14. As shown in Figure 2, the barn structure 10 is provided with three hoppers generally designated by the numeral 110. The three hoppers are the basic grain hopper 111, the supplement hopper 112, and the concentrate hopper 113. These hoppers are constructed to contain relatively large quantities of feed and are each provided with a narrow lower discharge neck in which paddle wheels 114 and 115 and 116 are positioned as best shown in Figure 13. The paddle wheels 114, 115, and 116 are all journalled on a driven shaft 117, said shaft being rotated by means of a pulley 118.

A drive pulley 119 is rigidly secured to and driven by the shaft 95 of the shredder mechanism 70. A drive belt 120 is driven by the pulley 119, said drive belt extending over idler sprockets 120' and extending to the pulley 118 for driving engagement therewith. As best shown in Figure 13, each paddle wheel 114, 115, and 116 is provided with transversely extending slats 121. Each of the paddle wheels is freely journaled on the driven shaft 117. Driving engagement between the shaft 117 and each of the paddle wheels is effected by means of planetary drive mechanisms 122, 123, and 124 best shown in Figures 13 and 14. The working arrangement of the parts of each planetary drive mechanism are similar and only the planetary drive 122 for the basic grain paddle wheel 114 will be described.

Figure 14:
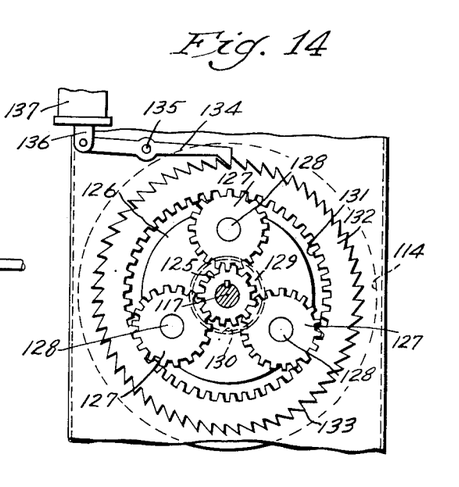
Figure 14 is an enlarged view of a planetary drive mechanism generally taken along the line 14—14 of Figure 13.

A pinion 125 is keyed to the shaft 117 for rotation therewith. The pinion is in driving engagement with a plurality of radially spaced pinions 127. The pinions 127 are freely journaled on stub shafts 128 which are rigidly secured to the end plate member 126. The plate member 126 is provided with a bearing 129 extending through an opening 130 in the basic grain hopper 111. The bearing 129 is securely connected to the paddle wheel 114 for driving the same. The pinions 127 are in driving engagement with the internal gear teeth 131 of a ratchet gear member 132. The ratchet gear member 132 is also provided at its outer periphery with a plurality of circumferentially extending ratchet teeth 133. The shaft 117 is continually driven by the shredder mechanism by means of the pulley 119, and the planetary pinions 127 are rotated thereby continually rotating the ratchet gear 132. The rotation of the pinions 127 is solely about the stub shafts 128 and the plate member 126 is standing still.

A holding pawl 134 is pivotally connected to the basic grain hopper as indicated at 135. A solenoid plunger 136 is pivotally connected to the holding pawl 134 and is movable within a solenoid 137. As the solenoid is energized by means which will be described later, the holding pawl 134 engages the ratchet teeth of the pinion gear 132, thereby holding the same against rotation. Continued driving movement of the shaft 117 causes the plate 126 to rotate, thereby in turn rotating the paddle wheel 114.

As best shown in Figure 13, the planetary drive mechanism 123 is also provided with a holding pawl 138 which is actuated by means of a solenoid 139. The planetary drive mechanism 124 is similarly provided with a holding pawl 140 which is actuated by a solenoid 141. The basic grain, supplements, or concentrate are placed in the hopper above the individual paddle wheels. As the paddle wheels are rotated by the planetary drive mechanism, and in view of the side of slats 121, predetermined quantities of the feed are rotated by the paddle wheels downwardly to the lower end of the hoppers, whereupon the same leaves the hoppers and is deposited upon the movable manger belt 31.

Hay feeding mechanism

Figure 9:
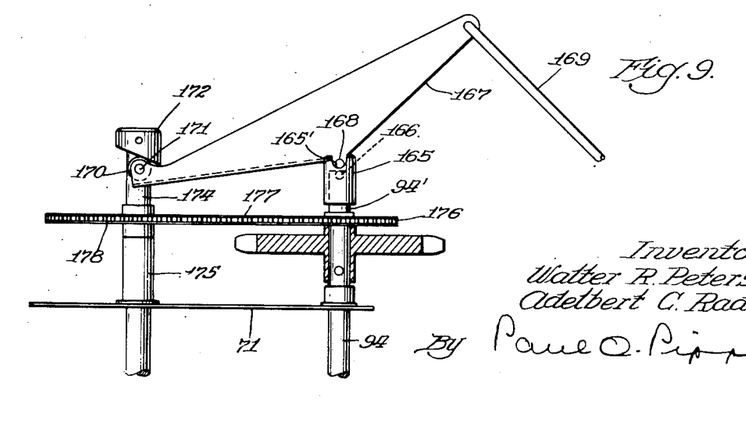
Figure 9 is a sectional view of a portion of a drive mechanism for a hay conveyor taken along the line 9—9 of Figure 8.
Figures 10, 11:
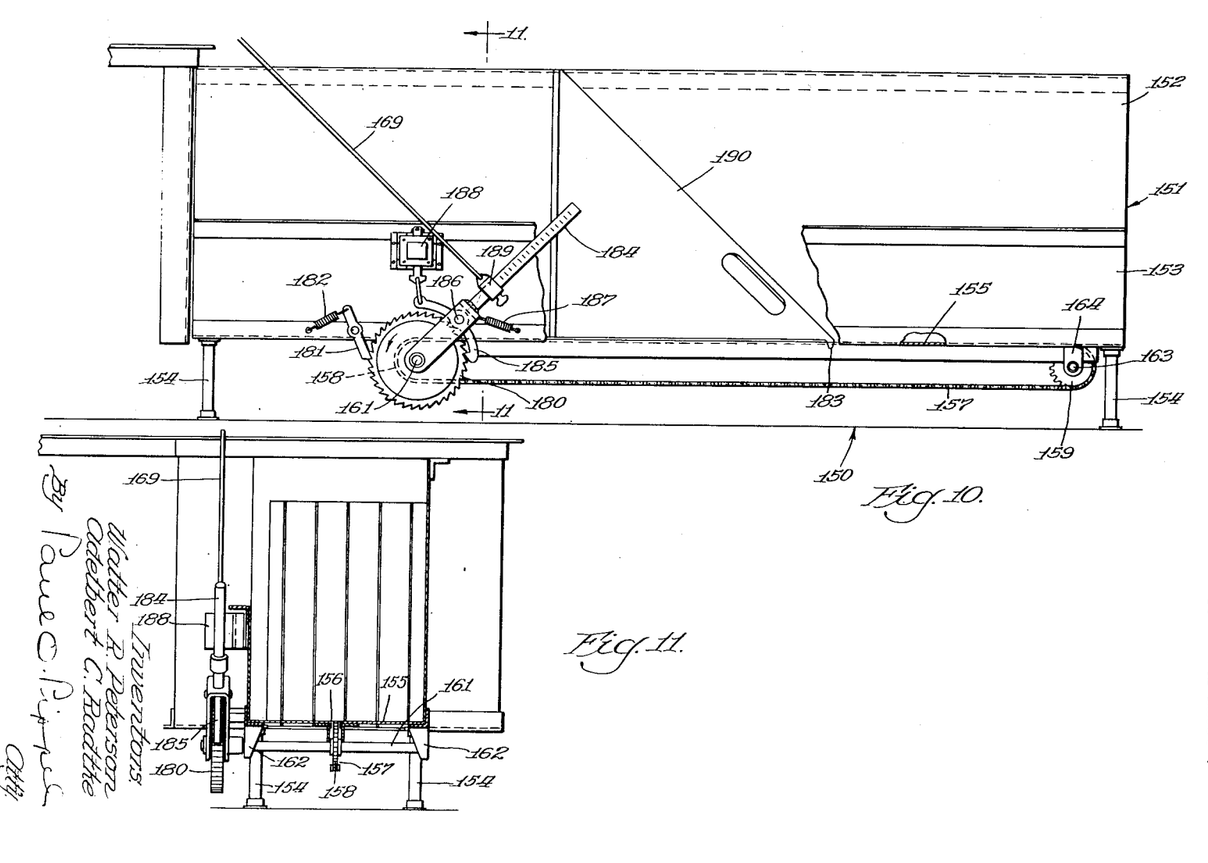
Figure 10 is an enlarged side view of a hay conveyor generally taken along the line 10—10 of Figure 1.
Figure 11 is a sectional view through a portion of the hay conveyor generally taken along the line 11—11 of Figure 10.

The hay feeding mechanism is best shown in Figures 2, 8, 9, 10, and 11 and is generally designated by the reference character 150. The hay feeding mechanism 150 is formed by a metal box-like structure 151. One side of the structure 151 is provided with a relatively high side wall 152 and the other side is provided with a relatively low side wall 153, best shown in Figure 11. The structure 151 is rigidly supported on a plurality of forward and rearward supports 154. A bottom wall of the structure 155 is provided, as best shown in Figure 11, with a longitudinally extending slot 156. An endless chain 157 is positioned to move within the slot 156. The chain 157 is trained about a forward sprocket 158 and a rearward sprocket 159. The sprocket 158 is secured to a driven shaft 161 journaled on bearing brackets 162. The rear sprocket 159 is journaled on a shaft 163 which is supported on bearing members 164.

The shaft 161 and sprocket 158 are driven from the triangular shredder mechanism 70. As best shown in Figures 8 and 9, the shaft 94 is provided at its upper end with an extension 94'. A bearing member 165 is in mating engagement with the extension 94' and is free to rotate with respect thereto. One or more ball bearings 166 are placed on the top edge of the extension 94' and the interior upper end of the bearing sleeve 165 is ground flat and forms a bearing surface in engagement with the ball bearings 166. A rocker arm 167 triangular in shape is pivoted about a longitudinal axis by means of a pivot pin 168 which is connected to the rocker arm and is journaled within a recess 165' formed in the top surface of the bearing member 165. The rocker arm is pivotally connected at one end to a link arm 169. The rocker arm 167 is provided at its other end with a roller 170. The roller 170 is journaled on a shaft 171 extending transversely through the end of the rocker arm 167. A cam 172 is rigidly secured to a shaft 174 which is journaled in a bearing member 175 secured to one of the supporting plate members 71.

As best shown in Figures 7 and 9 a sprocket 176 is secured to the shaft extension 94' for rotation therewith. The sprocket 176 is in driving engagement with a chain 177 which is trained around a sprocket 178 secured to the shaft 174 for driving engagement therewith. As the shaft 94 is being rotated, the sprocket 176 drives the shaft 174, thus effecting rotating movement of the cam 172. The roller 170 is in engagement with the camming surface of the cam 172, thereby causing rocking movement of the rocker arm 167. The rocking movement of the rocker arm 167 causes oscillatory movement of the link 169. The link 169 is arranged to actuate a sprocket 180 rigidly secured to drive the shaft 161 in a counter-clockwise direction. A holding pawl 181 is pivotally connected to the structure 151 and is held in engagement with the ratchet sprocket 180 by means of a spring 182. A lever arm 184 is pivotally connected to the shaft 161. The lever arm 184 has pivotally connected thereto a driving pawl 185 as indicated at 186. The lever arm 184 is held in extreme clockwise position by means of a tension spring 187. The link 169 is adjustably connected to the lever arm 184 and oscillatory movement of the link causes the lever arm 184 to swing back and forth, thereby rotating the ratchet sprocket 180.

A solenoid 188 is connected at one end of the driving pawl 185, said solenoid serving to pivot the pawl 185 about its pivot 186 in order to effect driving engagement between the pawl and the sprocket 180. The end of the lever arm 184 is provided with an adjustable collar 189 which may be moved along the lever arm 184 to provide for adjustment and limit the arcuate movement of the lever arm.

The chain 157 is engaged by a projection 183 formed at the lower end of a carrier member 190. As the chain is driven counter-clockwise by the sprocket 158 the carrier member is moved longitudinally toward the shredder mechanism 70. Bales of hay designated by the letter A in Figure 1 contained within the box-like structure 151 are thereupon moved forwardly into engagement with the scraper cleats 89 of the shredder.

An ensilage removal and elevating mechanism is shown generally at 191. This mechanism forms the basis of applicants' copending divisional application Serial No. 202,071, filed December 21, 1950.

As best shown in Figure 1, an ensilage feeding and proportioning mechanism is designated by the reference character 320. This mechanism forms the basis of applicants' copending application Serial No. 202,072, filed December 21, 1950.

The electrical control system

The electrical control system is best shown in Figures 15, 16, 17, 18, 19, and 20 and is referred to by the reference character 420. The electrical control system is provided for the purpose of actuating the mechanized units of the mechanized barn in a predetermined automatic and controlled manner to effectuate the feeding procedure which is desired.

Figure 15:
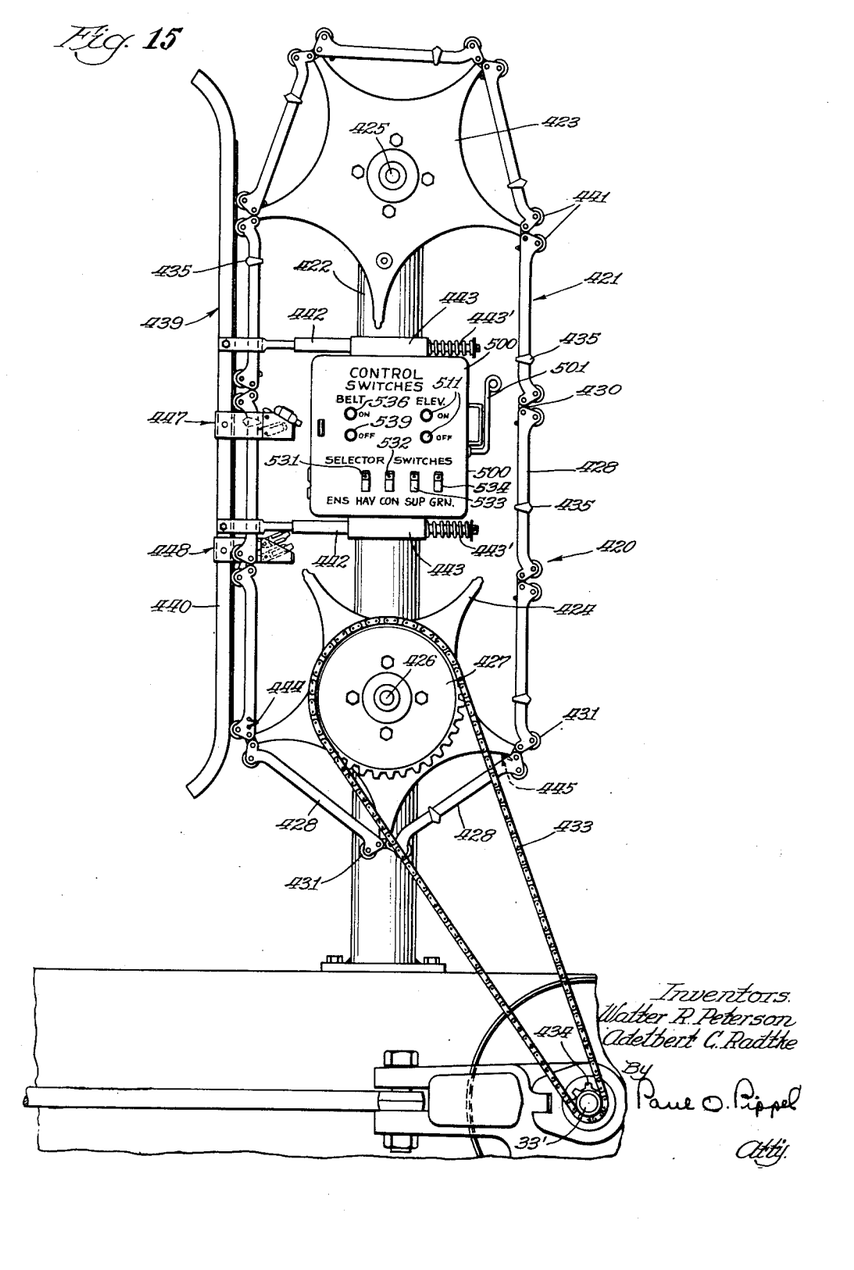
Figure 15 is a side elevational view of an electrical control and timing mechanism for the mechanized feeding unit of the barn.

A timing mechanism is generally referred to by the reference character 421. The timing mechanism, as shown in Figure 15, is placed near the end of the manger belt pulley 33 and consists of a vertically extending tubular member 422. The tubular supporting member 422 is provided with a pair of vertically spaced sprockets 423 and 424 which are respectively connected for rotation with shafts 425 and 426. A driving sprocket 427 is secured to the driving sprocket 424. A timing chain is indicated at 428. This chain is made up of a plurality of link sections, each link of each link section serving a definite purpose in the timing of the feeding mechanism.

Figures 16, 17, 18, 19, 20:
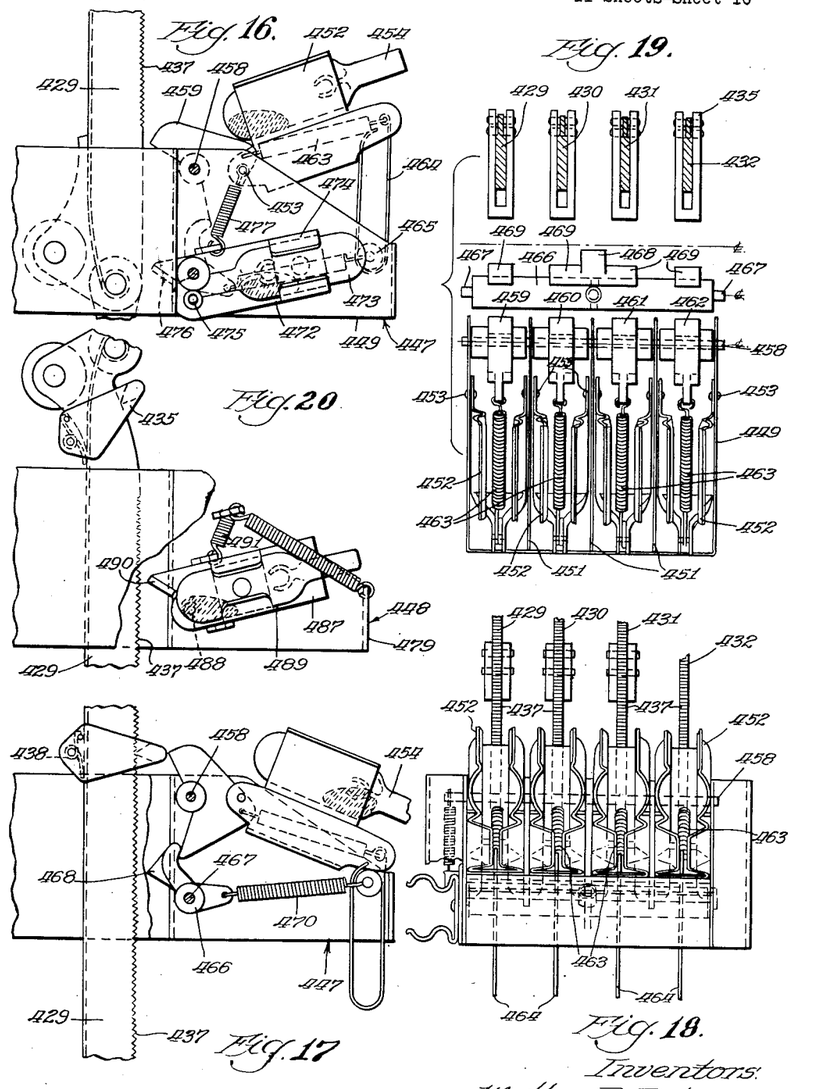
Figure 16 is a side elevational view of a switch mechanism, said switch mechanism showing a plurality of over-center mercury switches.
Figure 17 is a side elevational view of a single section of the switch mechanism shown in Figure 16, said view illustrating a closed position of one mercury switch.
Figure 18 is an end view showing the arrangement of the mercury switches shown in Figure 16.
Figure 19 is an exploded plan view of the switches and the mechanism shown in Figure 16, said view having center lines of certain vital parts of the mechanism spaced apart to better show the relationship of the parts.
Figure 20 is a side elevational view of a shredder mercury switch showing the open position of each switch and the various parts associated therewith.

The links are designated by the names of the feeding arrangement and stall position with which they are associated. As best shown in Figure 19, the link sections include a hay link 429, a concentrate link 430, a supplement link 431, and a basic grain link 432.

The chain 428 is driven by means of a driving chain 433 which is wound about a sprocket 434 securely connected to the shaft 33'. As the manger belt rotates, the driving chain 433 rotates sprocket 427 thereby rotating the chain 428 in a clockwise direction.

As best shown in Figures 15, 16, 17, 18, and 19, a self locking movable clip 435 is positioned on each of the links 429, 430, 431, and 432. These clips are present on eight of the link sections of the chain 428. They are not present on the remaining two link sections as shown in Figure 15. The eight link sections with the movable clips 435 are arranged to actuate the feeding mechanism placing feed automatically before the eight stalls of the barn. Each clip 435 is provided with an inner pointed portion which is adapted to engage serrated edges provided on each of the links. A spring 438 holds the clips securely in the serrations of each link.

As best shown in Figure 15 a tension guide mechanism 439 is provided for guiding the chain 428. The guide mechanism 439 includes a vertically extending member 440 having a smooth inner surface. The member 440 is resiliently held against the chain 428 by means of rod members 442, supporting members 443 and springs 443'. Each chain link section is also provided with roller members 441 which bear against the inner guide surface of the member 440.

A manger belt stop pin 444 is securely connected to one of the chain link sections of the chain 428. This stop clip is connected on the outermost edge of one of the outer links. It is to be noted that this chain link does not include any movable clip 435, nor does the link immediately following.

A shredder starting clip 445 is rigidly secured to one of the chain links as best shown in Figure 15. The connecting ends of the clip 445 are shown in dotted line position. It is to be understood that this link is positioned on the outermost surface of the outer link of this link section.

Mercury switch mechanisms 447 and 448 are positioned on the electrical control system 421. The switch mechanism 447 includes a bracket 449 which is rigidly secured to the guide member 440. The bracket 449 is of U-shaped design and is divided up into four equal spaces by means of dividing members 451. Within each space there is connected a switch clamping clip 452. Each clamping clip 452 is pivoted as indicated at 453 on the bracket 449. As best shown in Figure 19, the pivotal points of connection of these clamping clips are all in alignment with one another. The clamping clips 452 are provided to support a mercury switch 454, mercury switch 455, a mercury switch 456, and a mercury switch 457. The mercury switches are indicated in the wire diagram of Figure 21.

Referring particularly to Figures 16 and 19, it will be noted that a shaft 458 extends through, and is supported by the bracket 449. The shaft 458 supports cam elements 459, 460, 461, and 462, which are each in alignment with respective mercury switches. Each cam element is connected by means of a spring 463 to the end of each respective clip. A plurality of links 464 are also each connected to the end of the clips. The links 464 are adapted to engage bumper elements 465 thereby restraining the movement of the switch 454 in one direction about its pivotal point 453.

As best shown in Figure 19 a tripping member is designated at 466. The tripping member 466 has stub shafts 467 extending from the end therefrom and said member is journaled between the sides of the bracket member 449. The tripping member 466 is further provided with a camlike pointed projection 468 which is adapted to be engaged by the stop member 446 as indicated in Figure 16. The tripping member 466 includes projecting members 469 which are arranged to engage the cam members 459, 460, 461, and 462. As best shown in Figure 17 a spring 470 resiliently holds the tripping member 466 in the position indicated.

A manger belt switch 472 is pivotally connected at the outer surface of the bracket 449. The switch 472 includes a clip 474 which is pivoted as indicated at 475 to the bracket 449. A mercury tube 473 is held in clip 474. The clip 474 has a turned or angled end portion 476 which is adapted to engage the clip 444 mounted on the outer surface of one of the track link sections. A spring 477 resiliently holds the switch 472 in the position indicated in Figure 16.

The mercury switch mechanism 448, as shown in Figure 38 includes a bracket 479. A clip 487 is pivotally connected to the bracket 479 as indicated at 488. A mercury tube 489 is carried by the clip. The clip 487 is provided with a turned end portion 490 which is adapted to engage the shredder starting clip 445. The position of this clip is such that the movement of the chain 428 causes the starting clip 445 to engage and momentarily trip the mercury tube 489. A spring 491 holds the mercury tube 489 in the position indicated in Figure 38.

The electrical wiring system

The electrical wiring system is best shown in Figures 15, 16, 17, 18, 19 and 20 and 21. The master switch control box 500 is mounted on the tubular support 422. A master switch 501 is provided within the control box and is arranged to open and close a three wire electrical circuit. The three wire electrical circuit includes main circuits 502, 503, and 504.

Wires 505 to 507, inclusive lead to the ensilage removal mechanism 191 for controlling the same. This mechanism is clearly described in applicants' copending divisional application.

Figure 21:
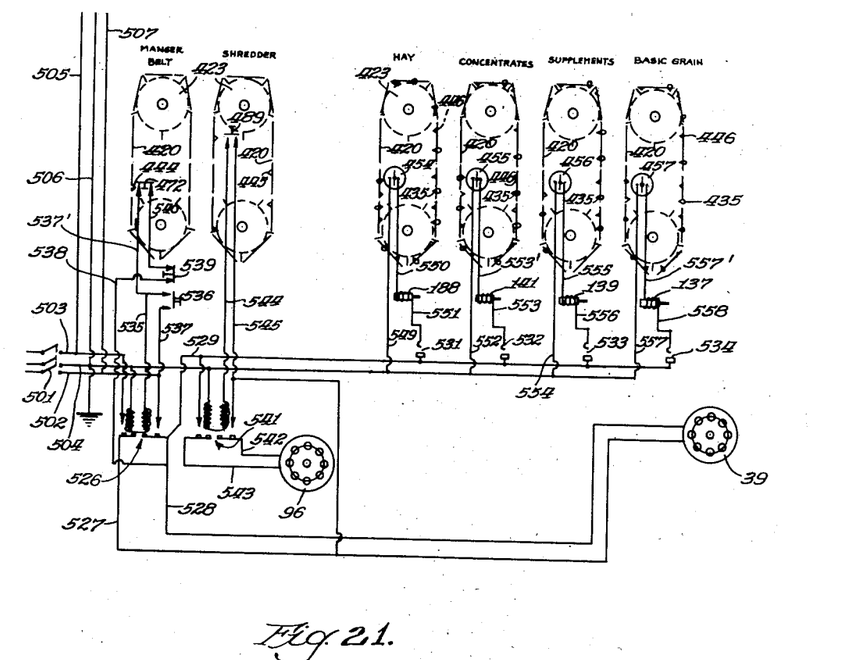
Figure 21 is a schematic wiring diagram showing the electrical circuits and switches of the mechanized feeding barn.

A relay switch is designated by the reference character 526. The switch 526 has wires 527 and 528 leading to the manger belt motor 39. A wire 529 connected to one of the terminal ends of the relay switch 526 extends to a plurality of selector switches 531, 532, 533, and 534 which are in series therewith. The selector switches are provided on the control box 500 positioned on the control mechanism 420. A wire 535 is connected to the winding of the relay 526 and extends to a manger belt control switch 472 which is best shown in Figures 21 and 16 mounted on bracket 449. A two-point make switch 536 is provided to start the manger belt manually. This switch is positioned on the control box panel 500 as shown in Figure 15. The switch 536 is connected at one side to a wire 537 extending down to the relay 526. A wire 537' is connected to the other side of the switch 536 and extends upwardly to a terminal at the switch 472. A wire 538 is connected to the switch 539, the wire 538 extending to one side of a two-point break switch 539 which is mounted on the control box panel 500. This switch is for the purpose of stopping the manger belt 31 manually. A wire 540 extends from one side of the switch 539 upwardly to the mercury switch 472.

A two-point relay make switch is indicated by 541. Wires 542 and 543 extend from this switch to the shredder motor 96. A wire 544 extends from the relay to the shredder switch 489 which is mounted on the bracket 479 as indicated in Figure 20. A wire 545 extends from the other side of the switch 489 downwardly to the other side of the relay.

Wire 549 is connected to the wire 504 and extends upwardly to the hay mercury switch 454 which is mounted on a mercury switch mechanism 447 as best shown in Figure 16. A wire 550 extends to the solenoid 188 from the switch 454. A wire 551 extends down to the selector switch 531.

A wire 552 extends upwardly to the concentrate mercury switch 455 which is also mounted on the mercury switch mechanism 447. A wire 553 extends to the selector switch 532. A wire 553' extends to the solenoid 141.

A wire 554 is connected to the wire 504 and extends upwardly to the supplement mercury switch 456 which is also mounted on the switch mechanism 447. A wire 555 extends to the solenoid 139. A wire 556 extends down to the selector switch 533.

A wire 557 is connected to the wire 504 and extends upwardly to the basic grain mercury switch 457 which is mounted on the mercury switch mechanism 447. A wire 557' extends to the solenoid 137 and a wire 558 extends down to the selector switch 534.

The mounting of the hay, concentrate, supplement, and basic grain mercury switches is the same for all as shown in Figure 16. Each switch is adapted to be individually cocked and turned off upon the action of the clips 435 and the stop clip 446.

*Operation*

The first step in the operation is the rotation of the manger belt. The electric motor 39 is energized by manually pushing the switch 536 which is located on the control panel 500. The momentary contact is sufficient to close the relay switch 526, thereby closing the circuit to begin rotation of the motor 39.

As the manger belt 31 is rotating, the sprocket 434 is in driving engagement with the chain 433 with the sprocket 427, thereby causing movement of the link sections of the chain 428. Previous to the operation of the timing mechanism 421, the movable clips 435 have been set with respect to the serrations 437 on the individual links 429, 430, 431, and 432. As previously determined, the farmer knows the individual requirements of hay, concentrate, supplements, and basic grain feed for each cow. As best shown in Figure 15 ten link sections are utilized. Eight of these link sections represent the number of stalls within the barn and each link section is made up of four individual links, each link representing the individual feed requirements for each cow except the silage requirement. By moving the movable clips 435 vertically on the individual links 429, 430, 431, and 432, the exact requirements of the various feeds may be supplied to each cow. The manner in which this is accomplished will presently be more clearly described.

As the manger belt 31 is moving, the timing mechanism 421 is also in operation. As best shown in Figure 15, a shredder starting clip 445 is positioned on one of the chain link sections. The shredder starting clip is in vertical alignment with a shredder mercury switch 489. As the clip 445 is driven past the mercury switch 489 it engages the end portion 490 of the clip 487 momentarily pivoting the mercury switch and tripping the same to an "on" position. This momentary closing of the circuit causes the relay switch 541 to close thereby closing the electrical circuit in the motor 96, thereby starting rotation of the shredder mechanism 70.

Clips 435 are so positioned on the links 429, 430, 431, and 432 that they respectively engage and trip mercury switches 454, 455, 456, and 457. As a clip 435 passes by the hay mercury switch 454, it engages trip element 459 which is pivoted on a shaft 458. The trip element 459 is rotated and a spring 463 causes the switch 454 to snap to the "on" position shown in Figure 17. As the switch 454 is thus closed, the solenoid 188 is energized. As the solenoid 188 is energized, the ratchet pawl 185 is arranged to engage ratchet wheel 180. The reciprocating movement of the link 169 by virtue of its connection to the rocking arm 167 causes the conveyor belt 157 to rotate counterclockwise, thereby moving the vertical push plate 190 toward the shredder mechanism 70. The baled hay is thereby pushed or moved into the shredder mechanism. The endless track scraper or shredder apron 76 brushes by the baled hay and the scraper cleats 89 remove hay from the bales and deposit the same on the manger belt 31. Continued further vertical forward movement of the link 435 and link section causes the stop 446 to engage the trip member 466 thus engaging the projection 468, thereby moving the tripping member 466.

As the tripping mechanism 466 is moved in a clockwise direction, one of the engaging surfaces 469 engages the cam element 459 thereby tripping the mercury switch 454 to the "off" position as shown in Figure 16. This breaks the circuit to the solenoid 188 and thereby movement of the chain 157 ceases so that no further hay is moved into the shredder unit and deposited upon the manger belt. It can be seen therefore that the position of the movable clip 435 with respect to the stop clip 446 determines the amount of hay which is to be delivered for each individual cow, since the amount of movement of the conveyor chain 157 is governed by the distance between the stop clip and the movable clip. It is of course understood that the position of the clip 459 may vary with respect to each link section, the individual requirements of the cow determining the position of the movable clip.

It should also be noted that the tripping member 466 will trip the hay, concentrate, supplement and basic grain mercury switches to the "off" position simultaneously since the stop member 446 is centrally disposed on the link sections.

The hopper feed mechanism 110 is controlled by means of the links 430, 431, and 432. The hopper 111 generally contains the basic grain which is to be fed to the cows. The hopper 112 contains the supplements which may consist of a feed containing a scientifically prepared quantity of vitamins, etc. The hopper 113 generally contains the concentrates made up of yeast, salts, etc.

As the timing mechanism 421 is moved and the link sections are moved upwardly, clips 435 respectively on the links 430, 431, and 432 cause mercury switches 455, 456, and 457 respectively to be tripped to a closed position. As these switches are closed, planetary drive mechanism 122, 123, and 124 are placed in operation by means of the actuation of solenoids 141, 139, and 137. Since the shaft 117 is rotated continually due to the driving arrangement of the belt 120, actuation of the solenoids causes the planetary drive mechanism to drive the individual paddle wheels 114, 115, and 116. The paddle wheels serve to deposit predetermined quantities of the concentrate, supplement, and basic grain feeds upon the movable manger belt 31. As the chain links move vertically on the electric control system 420, the stop 446 engages the tripping member 466 which simultaneously trips the basic grain, supplement, and concentrate mercury switches, thus opening the same and de-energizing the solenoids 141, 139, and 137 to stop movement of the paddle wheels and discharge of feed from the hopper feeding mechanism.

A plurality of selector switches 530, 531, 532, 533, and 534 are mounted on the control box 580. It can be seen from the wiring diagram Figure 21 that these switches can each be individually actuated to eliminate any one or all of the hay, concentrate, supplement, or basic grain feeding arrangements. Thus complete control of these mechanisms is assured.

After a sufficient amount of feed has been deposited upon the manger belt and the manger belt has come to a position whereupon the predetermined quantities of feed are now adjacent the feeding ends of the stalls of the individual animals, the manger belt automatically stops. This stopping action is accomplished by means of a stop clip 444 which engages and trips the manger belt mercury switch 472 to an "off" position. This effects opening of the relay switch 526 thereby breaking the circuit to the motor 39. As indicated in the wiring diagram Figure 21 the shredder motor 96, and relay 541 are in series with the relay switch 526 and stopping of the motor 39 also causes the shredder motor 96 to cease functioning. Since the shredder motor drives all feeding mechanisms these units are now also stopped since the feeding operation has been accomplished.

Figure 12:
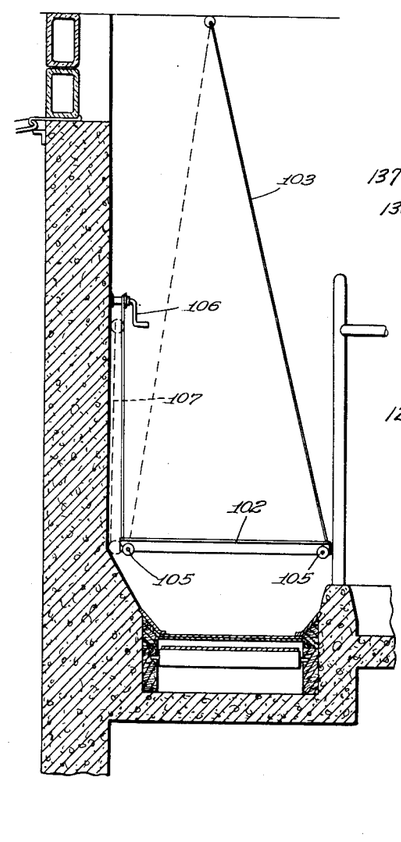
Figure 12 is an enlarged sectional view of a gate for a movable manger belt generally taken along the line 12—12 of Figure 1.

As shown in Figure 12, a gate or guard member 102 is suspended over the manger belt by means of a cable 103. The gate 102 is provided with a plurality of rollers 105 which are adapted to engage the side wall 19 when said gate is moved to an out of the way vertical position. A winch 106 receives a cable 107 which is connected to the gate 102. The gate 102 can be moved to the out of way position shown in the dotted lines of Figure 12 by operating the winch 106. Thus when the manger belt has moved to its feeding position adjacent the feeding ends of the stall, the gate is raised, thereby permitting the cows to begin their feeding.

It can thus be seen that an automatic feeding arrangement has been provided for feeding animals within a dairy barn, this feeding arrangement being both practical in construction and inexpensive to maintain. The arrangement has been shown for a small dairy barn, but it can readily be understood that the number of cattle which may be fed by this mechanism is not limited to the number shown. By making minor changes in the arrangement and size of parts and the barn a longer feed line of stalls can easily be accommodated. It can be seen that a novel mechanism has been provided for removing ensilage from a trench silo, the arrangement being such that a minimum amount of supervision is required by the operator. It can readily be appreciated that the accurate and automatic feeding mechanism of the type invented by applicants will increase the productive capacity of the individual cows while at the same time lowering the labor cost and expenses encountered in the conventional dairy farm.

It is to be understood that modifications may be made which do not depart from the spirit of the invention as disclosed nor the scope thereof as defined in the appended claims.

What is claimed is:

1. A dairy establishment comprising in combination, a farm building having a plurality of stationary animal stalls, each stall having a feeding end, a feeding device for supplying feed to the animals in the stalls, said device including an endless manger belt positioned laterally with respect to the stalls and being adapted to move feed adjacent the feeding end of each stall, power means connected to said manger belt for moving the same, means for supplying feed to said manger belt, said means including a shredder mechanism, means supporting said shredder mechanism and said manger belt with said shredder mechanism being positioned above and adjacent one end of said manger belt, and power means connected to said shredder mechanism for driving the same, and control means connected to said manger belt and said shredder mechanism for controlling the shredder mechanism whereby baled feed supplied to said shredder mechanism is shredded and deposited by said shredder mechanism on said moving manger belt.

2. A dairy establishment comprising in combination, a farm building having a plurality of stationary animal stalls, each stall having a feeding end, a feeding device for supplying feed to each stall, said device including an endless manger belt positioned to move laterally with respect to the stalls and thereby move feed adjacent the feeding end of each stall, power means connected to the manger belt for moving the same, and means for supplying feed to said movable manger belt including a movable conveyor positioned adjacent the manger belt, a movable scraper mechanism supported between the conveyor and the manger belt and arranged to remove feed from said movable conveyor and deposit the same on said manger belt, and control means connected to the manger belt and to the movable conveyor for moving the same in response to movement at the manger belt.

3. A dairy establishment comprising in combination, a farm building for containing animals, a feeding device for supplying feed to the animals including a movable manger belt, power means connected to said manger belt for moving said manger belt, means for distributing preselected quantities of feed to the animals including a movable conveyor belt supported adjacent said manger belt, a power actuated scraper mechanism supported between said manger belt and said conveyor belt and arranged to remove feed from said movable conveyor and deposit the same on said moving manger belt and means connected to said conveyor for moving the conveyor including a control means connected to said manger belt and responsive to movement thereto.

4. A dairy establishment comprising in combination, a farm building having a plurality of stationary animal stalls, each stall having a feeding end, a feeding device for supplying preselected quantities of feed to each stall, said device including a movable manger belt arranged to move laterally with respect to said stalls and adjacent the feeding end of each stall, a shredder mechanism supported above one end of said manger belt and being operatively associated therewith, said shredder mechanism including movable scraper means, a conveyor arranged to move packed quantities of animal feed toward said shredder mechanism and said manger belt, and means connected to said conveyor and to said shredder mechanism for moving said conveyor a preselected distance toward said shredder mechanism to supply predetermined amounts of feed to said scraper means, said means including an electrical control mechanism connected to the manger belt and operable in response to movement thereof, said scraper means being arranged and constructed to deposit said feed on said manger belt.

5. A dairy establishment including a farm building having a plurality of stationary animal stalls, the combination therewith of a feeding mechanism for supplying feed to each stall comprising a movable manger belt adjacent the feeding end of each stall, power means connected to the manger belt for moving said belt, feed dispensing mechanisms arranged to deposit feed on said manger belt, an electrical control unit removed from said moving manger belt, said control unit including a timing chain consisting of a plurality of interconnected links, movable clips on said links, electrical switch elements stationarily mounted on said control unit, said switch elements being connected to control the dispensing of feed from said dispensing mechanism, driving means connecting said timing chain and said movable manger belt, the clips on said links being positioned to actuate said switch elements thereby dispensing feed from said dispensing mechanisms in measured quantities to said manger belt.

6. A dairy establishment including a farm building having a plurality of stationary animal stalls, the combination therewith of a hay feeding mechanism for supplying feed to each stall comprising a movable manger belt adjacent the feeding end of each stall, power means connected to the manger belt for moving said belt, a hay dispensing conveyor arranged to deposit hay on said manger belt, electrical power means driving the same, a control unit for said hay dispensing conveyor, said control unit including a timing chain arranged to be driven by said manger belt, a switch element stationarily mounted with respect to said timing chain, and start and stop members on said timing chain, said members being positioned to engage said switch element for regulating the electrical energy to said electrical power means thereby controlling the movement of said conveyor and regulating the quantity of hay deposited on said manger belt.

7. A dairy establishment including a farm building having a plurality of stationary cow stalls, the combination therewith of a feeding mechanism for supplying feed to each stall comprising a movable manger belt, power means connected to the manger belt for moving said belt, a plurality of feed dispensing mechanisms positioned to deposit feed on said manger belt, an electrical control unit for said mechanisms, said control unit including a timing chain, a plurality of interconnected link sections in the chain, each link section representing an individual cow stall, a plurality of links in each link section, each link representing an individual feed dispensing mechanism, start and stop elements on each link, a stationary switch for each link, each switch being arranged to electrically control one of the feed dispensing mechanisms, and means connected to the manger belt for driving said timing chain, said start and stop elements being positioned to actuate said switches thereby controlling the quantity of feed discharged for each stall from each feed dispensing mechanism.

8. A dairy establishment including a farm building having a plurality of stationary animal stalls, the combination therewith of a feeding mechanism for supplying feed to each stall, comprising a movable manger belt adjacent the animal stalls, a feed dispensing means supported adjacent the manger belt to dispense feed thereto, power means connected to the manger belt and to said feed dispensing means for moving the manger belt and for actuating said feed dispensing means, and electrical control means operatively connected to said feed dispensing means and said manger belt for controlling said dispensing means in response to movement of said manger belt whereby said dispensing means is actuated to deposit predetermined quantities of feed on various portions of said manger belt.

9. A dairy establishment including a farm building having a plurality of animal stalls, the combination therewith of a feeding mechanism for supplying feed to each stall comprising a movable manger belt adjacent the feeding end of each stall, a feed dispensing means supported adjacent said manger belt and arranged to deposit feed on said manger belt, an electrical control unit connected to said manger belt, electrical switch elements connected to said feed dispensing means and to said control unit for controlling the discharge of feed from said dispensing means, and movable means on said control unit adapted to engage and actuate said switch elements in response to movement of said manger belt whereby measured quantities of feed are dispensed from said dispensing means to said manger belt.

10. In a dairy establishment having a plurality of animal stalls, each stall having a feeding end; a feeding device for supplying feed to an animal in each stall, said device comprising an endless movable manger belt positioned in a direction extending laterally with respect to the stalls, a rotatable member disposed at an end of said manger belt for moving said manger belt in a direction laterally with respect to said stalls, a power unit connected to said rotatable member for moving the same, a shredding unit disposed adjacent one end of said manger belt, said shredding unit including a movable shredding element, movable means adjacent said shredding element for moving a bale of feed material into engagement with said shredding element, and a second power unit connected to said shredding element for moving the same, and means connected to said movable means and said manger belt and responsive to movement of said belt for actuating said movable means to move said conveyor whereby feed material is removed from the bale and deposited on said movable manger belt.

WALTER R. PETERSON.
ADELBERT C. RADTKE.

References Cited in the file of this patent

UNITED STATES PATENTS

| Number | Name | Date |
|---|---|---|
| 238,304 | Osterberg | Mar. 1, 1881 |
| 632,171 | Bolinski | Aug. 29, 1899 |
| 674,746 | Tindell | May 21, 1901 |
| 804,057 | Scott | Nov. 7, 1905 |
| 1,186,444 | Schuchardt | June 6, 1916 |
| 1,375,961 | Hart | Apr. 26, 1921 |
| 1,437,004 | Neumann | Nov. 28, 1922 |
| 1,479,990 | Keys | Jan. 8, 1924 |
| 1,518,664 | Maryott | Dec. 9, 1924 |
| 1,550,311 | Foster | Aug. 18, 1925 |
| 1,727,353 | Merrick | Sept. 10, 1929 |
| 1,970,291 | Everhard | Aug. 14, 1934 |
| 2,128,252 | Johnson | Aug. 30, 1938 |
| 2,285,765 | Carswell | June 9, 1942 |
| 2,302,314 | Haggart | Nov. 17, 1942 |
| 2,310,592 | Noble | Feb. 9, 1943 |
| 2,358,000 | Cornell | Sept. 12, 1944 |
| 2,410,873 | Gayring | Nov. 12, 1946 |
| 2,487,342 | Koenig | Nov. 8, 1949 |

FOREIGN PATENTS

| Number | Country | Date |
|---|---|---|
| 21,489 | Denmark | Sept. 11, 1916 |
| 209,832 | Great Britain | Jan. 18, 1924 |
| 323,652 | Great Britain | Jan. 9, 1930 |